(12) United States Patent
Lean et al.

(10) Patent No.: US 8,268,169 B2
(45) Date of Patent: Sep. 18, 2012

(54) MEMBRANE BIOREACTOR (MBR) AND MOVING BED BIOREACTOR (MBBR) CONFIGURATIONS FOR WASTEWATER TREATMENT

(75) Inventors: Meng H. Lean, Santa Clara, CA (US); Joe Zuback, Camarillo, CA (US); Nitin Parekh, Los Altos, CA (US); Norine E. Chang, Menlo Park, CA (US); Huangpin Ben Hsieh, Palo Alto, CA (US); Kai Melde, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 28 days.

(21) Appl. No.: 12/973,083

(22) Filed: Dec. 20, 2010

(65) Prior Publication Data

US 2012/0152814 A1 Jun. 21, 2012

(51) Int. Cl.
*B01D 33/70* (2006.01)
(52) U.S. Cl. .......................................... 210/151; 210/220
(58) Field of Classification Search .................. 210/151, 210/220
See application file for complete search history.

(56) References Cited

U.S. PATENT DOCUMENTS

| | | |
|---|---|---|
| 2008/0006571 A1 | 1/2008 | Arnaud |
| 2008/0128331 A1 | 6/2008 | Lean et al. |
| 2008/0230458 A1 | 9/2008 | Lean et al. |
| 2009/0050538 A1 | 2/2009 | Lean et al. |
| 2009/0114601 A1 | 5/2009 | Lean et al. |
| 2009/0114607 A1 | 5/2009 | Lean et al. |
| 2009/0283452 A1 | 11/2009 | Lean et al. |
| 2009/0283455 A1 | 11/2009 | Lean et al. |
| 2010/0072131 A1 | 3/2010 | Nick et al. |
| 2010/0072142 A1 | 3/2010 | Lean et al. |
| 2010/0140092 A1 | 6/2010 | Volkel et al. |

FOREIGN PATENT DOCUMENTS

EP 2060312 A2 5/2009

OTHER PUBLICATIONS

U.S. Appl. No. 12/484,071, filed Jun. 12, 2009, by Lean et al., titled "Method and Apparatus for Continuous Flow Membrane-Less Algae Dewatering".
U.S. Appl. No. 12/484,038, filed Jun. 12, 2009, by Lean et al., titled "Stand-Alone Integrated Water Treatment System for Distributed Water Supply to Small Communities".
U.S. Appl. No. 12/484,005, filed Jun. 12, 2009, by Lean et al., titled "Spiral Mixer for Floc Conditioning".
U.S. Appl. No. 12/484,058, filed Jun. 12, 2009, by Lean et al., titled "Platform Technology for Industrial Separations".
U.S. Appl. No. 12/967,172, filed Dec. 14, 2010, by Volkel et al., titled "'Electrocoagulation System".
U.S. Appl. No. 12/972,684, filed Dec. 20, 2010, by Lean et al., titled "Systems and Apparatus for Seawater Organics Removal".
EP Search Report, EP11194681.0-1213, Mailed May 4, 2012, Completed Apr. 25, 2012, The Hague.

*Primary Examiner* — Chester Barry
(74) *Attorney, Agent, or Firm* — Fay Sharpe LLP

(57) ABSTRACT

The water treatment system and method incorporating the use of a hydrodynamic separator to remove most of the total suspended solids (TSS) in source water being treated to thereby lighten the load on membrane filtration in the water treatment system and lower energy costs.

20 Claims, 15 Drawing Sheets

MEMBRANE BIOREACTOR (MBR) AND MOVING BED BIOREACTOR (MBBR) CONFIGURATIONS FOR WASTEWATER TREATMENT

INCORPORATION BY REFERENCE

The following co-pending and commonly assigned applications, the disclosures of each being totally incorporated herein by reference, are mentioned:

U.S. Published Application No. 2009/0050538, entitled, "Serpentine Structures for Continuous Flow Particle Separations", by Lean et al.;

U.S. Published Application No. 2008/0128331, entitled, "Particle Separation and Concentration System", by Lean et al.;

U.S. Published Application No. 2008/0230458, entitled, "Vortex Structure for High Throughput Continuous Flow Separation", by Lean et al.;

U.S. Published Application No. 2009/0114601, entitled, "Device and Method for Dynamic Processing in Water Purification", by Lean et al.;

U.S. Published Application No. 2009/0114607, entitled, "Fluidic Device and Method for Separation of Neutrally Buoyant Particles", by Lean et al.;

U.S. Published Application No. 2010/140092, entitled, "Flow De-Ionization Using Independently Controlled Voltages", by Armin R. Volkel et al.;

U.S. Published Application No. 20100314323, entitled, "Method and Apparatus for Continuous Flow Membrane-Less Algae Dewatering", by Lean et al.;

U.S. Published Application No. 2009/0283455, entitled, "Fluidic Structures for Membraneless Particle Separation", by Lean et al.;

U.S. Published Application No. 2009/0283452, entitled "Method and Apparatus for Splitting Fluid Flow in a Membraneless Particle Separation System", by Lean et al.;

U.S. Published Application No. 20110108491, entitled, "Desalination Using Supercritical Water and Spiral Separation", by Lean et al.;

U.S. Published Application No. 2010/0072142, entitled, "Method and System for Seeding with Mature Floc to Accelerate Aggregation in a Water Treatment Process", by Lean et al.;

U.S. Published Application No. 20100314263, entitled, "Stand-Alone Integrated Water Treatment System for Distributed Water Supply to Small Communities", by Lean et al.;

U.S. Published Application No. 20100314325, entitled, "Spiral Mixer for Floc Conditioning", by Lean et al.;

U.S. Published Application No. 20100314327, entitled, "Platform Technology for Industrial Separations", by Lean et al.;

U.S. patent application Ser. No. 12/967,172, filed Dec. 14, 2010, entitled, "Electrocoagulation System", by Volkel et al., U.S. patent application Ser. No. 12/967,147, filed Dec. 14, 2010, entitled, "All-Electric Coagulant Generation System", by Volkel et al.; and U.S. patent application Ser. No. 12/972,684, filed Dec. 20, 2010, entitled, "System and Apparatus for Seawater Organics Removal", by Meng H. Lean et al.

BACKGROUND

A variety of systems for processing water have been developed. Such processes often are of a multi-stage filtration design and include sequential processing steps for coagulation, flocculation, and sedimentation.

Sources of water to be processed include surface water, ground water, wastewater, brackish water, sea water, among others. One specific conventional source water treatment is based on an activated sludge process (ASP), which filters, performs solids removal and pre-treats the source water to remove from the source water containments, solids, etc. in the form of sludge. Thereafter, an aeration zone or bath is provided which permits the injections of air into the bath to aerate the treated source water. Following aeration the treated source water is provided a settler tank for additional separation and sludge removal. Thereafter, additional filtration and disinfection steps are used to produce effluent water. The ASP system is, however, quite time consuming, and requires large areas of land, and produces large amounts of sludge.

Another water treatment process includes the use of membrane bioreactors (MBR). In these systems, the initial steps of solid removal and pre-treatment, as well as providing the water to an aeration zone or bath may be similar to the steps discussed above. However, in the MBR process in place of settler tanks and further filtration and/or disinfection, the MBR process employs specialized membranes which are used to operate on source water having 5-12,000 mg/l total suspended solids (TSS). The MBR process employs ultra-filtration (UF) and micro-filtration (MF) membranes. Membrane core sizes are in the range of 0.003 to 0.01 µm. The MBR technology commonly will submerge the membranes into the bioreactor. The submerged configuration relies on coarse bubble aeration to produce mixing and limit fouling. Aeration maintains solids in suspension, scours the membrane surface and provides oxygen to the biomass, leading to better degradability and cell synthesis.

MBR filtration performance decreases with filtration time, due to the deposition of soluble and particulate materials onto and into the membrane. Membrane fouling results from interaction between the membrane material and the components of the activated sludge, which includes but is not limited to biological floc formed by living or dead microorganisms along with soluble and colloidal compounds.

Membrane fouling is a serious problem affecting the system performance; as it leads to significant increase in hydraulic resistance, manifested as permeate flux decline or trans-membrane pressure (TMP) increase. Therefore, frequent membrane cleaning and replacement is required.

Presently, air-induced cross-flow obtained in submerged MBR is used to remove or at least reduce the fouling layer on the membrane surface. Other anti-fouling strategies that can be applied to MBR applications include intermittent permeation, where the filtration is stopped at a regular time interval before being resumed. In this way, particles deposited on the membrane surface tend to diffuse back to the reactor. Membrane backwashing is used where permeation water is pumped back to the membrane and flows through the pores to feed the channel dislodging internal and external particles. Still a further anti-fouling strategy is air backwashing, where pressurized air on the permeate side of the membrane build up and release a significant pressure within a very short time period. In this situation, the membrane modules need to be in a pressurized vessel coupled to a vent system. Air is not intended to go through the membrane, as if it did, the air would dry the membrane and a re-wet step would be necessary.

Thus MBR based processes involve high capital costs due to the expensive membranes, and high operation and maintenance costs due to increased energy for the aeration, trans-membrane pressure, and frequent back-flushing and/or other cleaning of the membranes to maintain their usefulness. Particularly, avoiding membrane fouling and clogging due to organics require the frequent maintenance such as the mentioned backwash. Maintaining the integrity of the membranes is important as compromised membrane integrity produces a sludge of TSS in the final water product.

With attention to the mentioned high capital expenditures of MBR systems, membrane replacement costs are much higher for 5-12,000 mg/l TSS capable membranes, as compared to conventional membranes designed for less than 100 mg/l TSS.

Yet another source water processing technology is known as a moving bed bioreactor (MBBR). The MBBR technology is employed in advanced high-rate source water treatment processes utilizing free-floating bio-film carrier elements in aerobic, anaerobic and anoxic reactors. The carrier elements are effectively hybrids between attached and suspended growth treatment processes, which require significantly less footprint area and natural resources to build and operate compared to other available treatment alternatives.

The bio-film carrier elements provide a very large effective bio-film surface area. The biomass is trapped inside the carrier elements, and the carrier elements are kept within the reactor by an outlet sieve. The movement of these carrier elements is driven by a coarse bubble air distribution system based on a rotary displacement air blower in aerobic systems, and a mixer in anoxic and anaerobic systems. While utilizing the MBBR technology, the filling fraction of carriers in the reactor may be varied to suit the specific loadings of the source water. Treatment plants can also be designed with a number of configurations of MBBR's and combination processes to target specific contaminants.

It would be desirable to use a source water treatment process that either does not need high cost membranes such as used in MBR systems, called MBR-Lite, or if such membranes are used, to extend their operation time between backwash and lower the associated maintenance costs. Still further, it would be beneficial in MBBR systems, to extend the life of the carriers and/or lower maintenance requirements by reducing the stress on the carriers.

BRIEF DESCRIPTION

The water treatment system and method incorporates the use of a hydrodynamic separator to remove most of the total suspended solids (TSS) in source water being treated to thereby lighten the load on membrane filtration in the water treatment system and lower energy costs.

DETAILED DESCRIPTION

Figure 1:
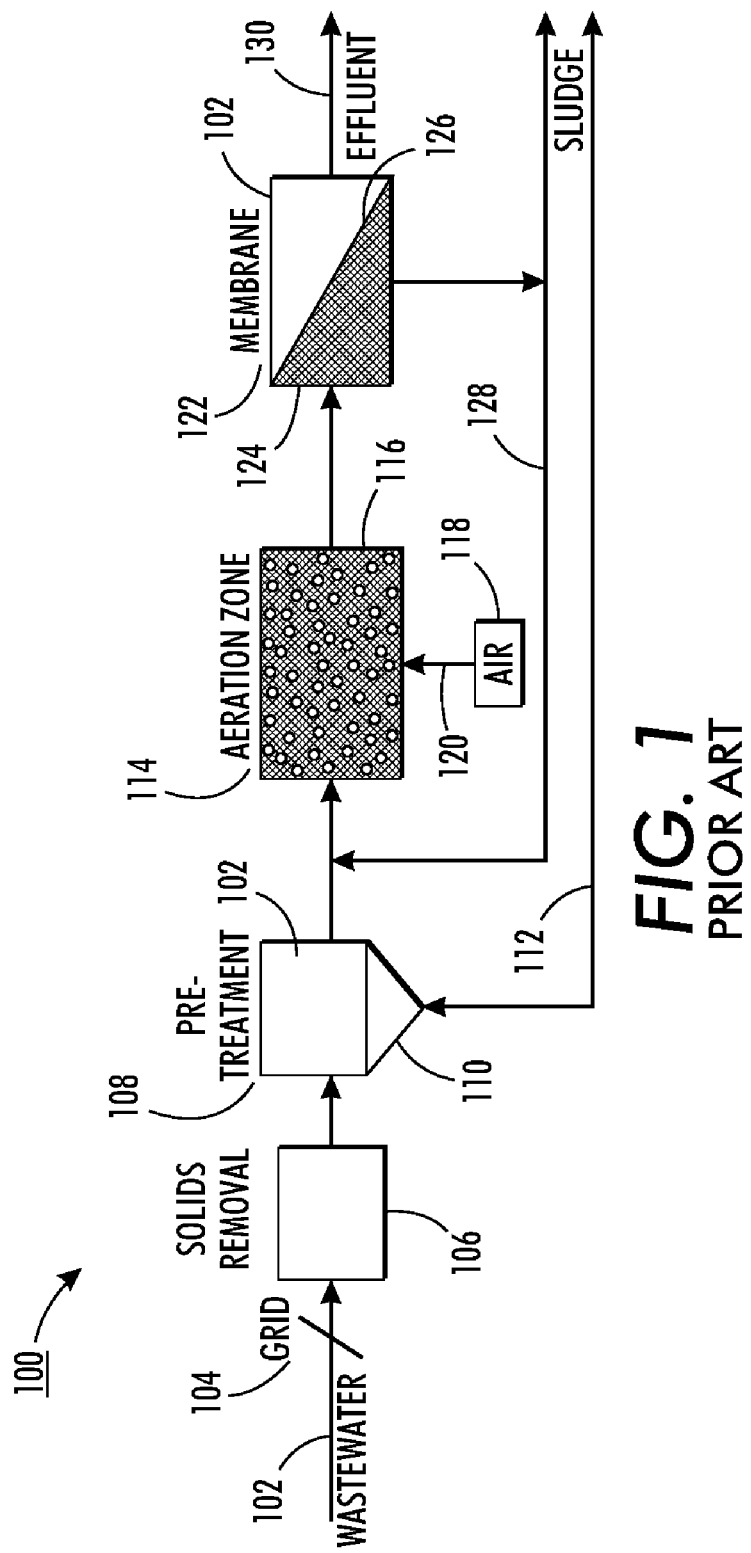
FIG. 1 is an illustration of a source water treatment system incorporating a membrane bioreactor used in the existing art.

FIG. 1 illustrates a membrane bioreactor (MBR) source water treatment process system 100. The source water may, as mentioned, be water from a number of different locations and may contain algae and/or active sludge bacteria floc, among other elements. Source water containing active sludge biological floc should behave very similarly to algae-laden water, both having similar specific gravity. Such floc is often formed on filamentous bacteria, and floc size will decrease with increasing sludge age. Active sludge bacteria floc also posses the same risk of biofilm accumulation as that of water carrying algae, and range in size between 10-200 microns. Biological floc can be found in concentrations of 500-10000 mg/l (TSS). Granular sludge up to 1 mm can be formed under certain conditions and selected bacteria strains.

In system 100, source water 102 is supplied through a grid or screen 104. A solid removal module 106 processes the source water 102 in a known manner to remove larger solid particles, and then passes the treated source water to a pretreatment system or module 108. Such pretreatment systems are well known in the art and are used to perform initial separation of particles from the source water. Such separation is at least in part is accomplished by having particles settle and concentrate into the form of sludge 110 at the bottom of pretreatment system 108. The resulting sludge 110 is taken out via line 112. The pretreated source water 102 is then passed to an aeration zone (also called basin or bath) 114 to which air bubbles 116 are supplied by air generator 118 via an air input line 120. Aeration of the source water 102 is undertaken in a known manner, and the activated source water 102 is then passed to MBR module or system 122. On the left-hand side of the MBR module 122 is sludge 124 that has been filtered out by membranes 126 and which is passed out of MBR module via line 128. The treated clarified source water 102 is then passed out via line 130 for either further processing or an intended end use. It is noted line 128 also provides sludge back to an input of the aeration zone 114 to assist in the aeration process.

Figure 2:
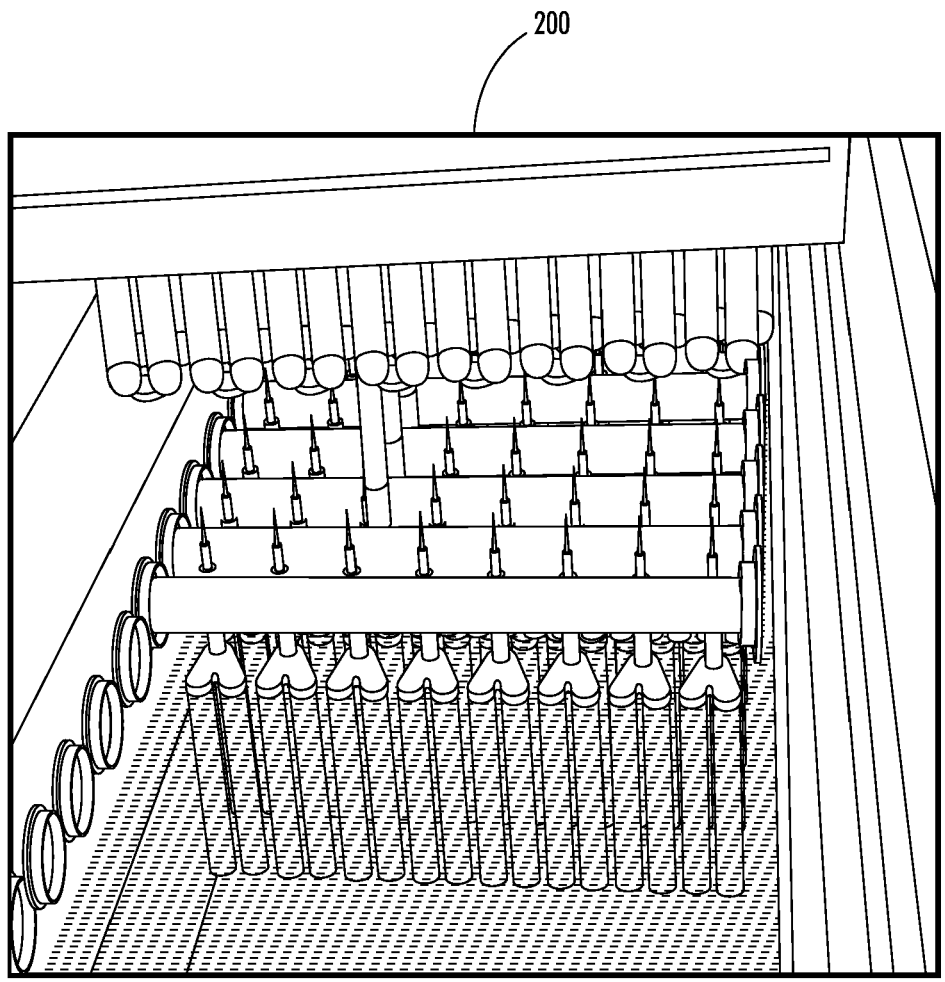
FIG. 2 illustrates a plurality of membrane filtration modules.

Membranes 126 of MBR module 122 are in one embodiment hollow fiber membranes, designed to operate with source water having 5-12,000 mg/l TSS. FIG. 2 depicts a plurality of membrane modules 200. Such membranes have a high capital expenditure and membrane replacement cost compared to other conventional filters and/or membranes such as membranes designed to operate with source water having less than 100 mg/l TSS. Therefore, the cost of operating the system as shown in FIG. 1 is increased due to employment of such high cost high maintenance membranes.

In one embodiment, by use of the hydrodynamic separator, algae and/or TSS which is greater than 6 μm is separated from the source water effluent and diverted into algae/TSS waste stream with 95% efficiency. In some water treatment situations 50% water recovery is "good enough" to make a water treatment system useful since solids are recycled.

Figure 3:
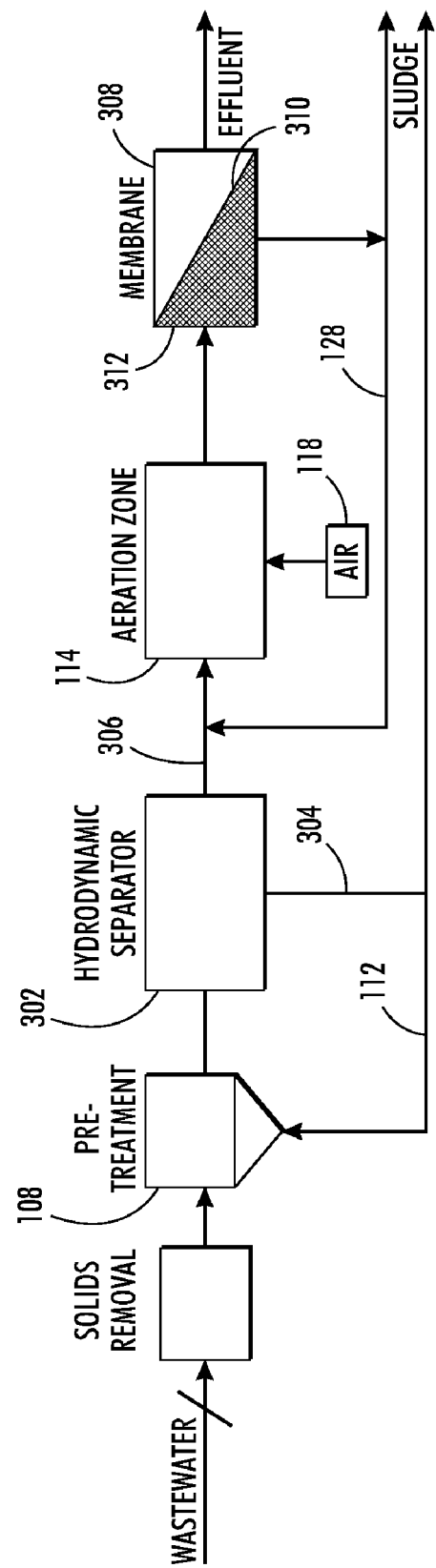
FIG. 3 illustrates a membrane bioreactor water treatment system incorporating a hydrodynamic separator.

To address issues related to existing MBR based water treatment systems. FIG. 3 illustrates a MBR-lite processing system 300, where a hydrodynamic separator 302 is incorporated into system 300 after pretreatment system 108 to receive the source water 102 output from pretreatment system 108. Hydrodynamic separator 302 includes a waste outlet 304 that moves sludge that has been removed by the hydrodynamic separator 302 to line 112. The acted upon source water 102 is then sent to aeration zone 114, via source water outlet 306 and is processed therein in a manner similar to that described in connection with FIG. 1.

From the aeration zone or bath 114 source water 102 is then passed to a filtering module 308 which includes at least one and commonly multiple filtering elements 310 such as membranes. As seen in this figure the filtering elements filter out sludge 312, which is provided to line 128.

It is understood that in FIG. 3, filtering elements 310 of filtering module 308 may be membranes having a filtering capacity less than the high filtering capacity of the membranes described in connection with FIG. 1. More specifically membranes of membrane filtering module 308 in this embodiment can be membranes designed for use with source water having less than 100 mg/l TSS, as opposed to high capacity or capability membranes which operate with 5-12,000 mg/l TSS and therefore have a range of operation from greater than 100 mg/l up to about 12,000 mg/l compared to less expensive membranes. Thus, by use of one embodiment of MBR-lite, it is understood that by removing additional materials from the source water by the hydrodynamic separation, it is not necessary to use the more capital expensive membranes, but rather the lower cost membranes (i.e., the less than 100 mg/l TSS) may be implemented. Therefore, the MBR-lite system may be understood to be a low cost membrane bioreactor (MBR) design for source water treatment. The hydrodynamic separator concentrates and removes much of the TSS. The reduced TSS allows the use of the less-expensive membranes for reducing capital expenditures. Further, even if the more expensive membranes (5-12,000 mg/l) are used, there is less necessity of cleaning, replacing, etc., which means there would be lower operational costs in the form of lower energy requirements, parts costs and lower maintenance.

Figure 4:
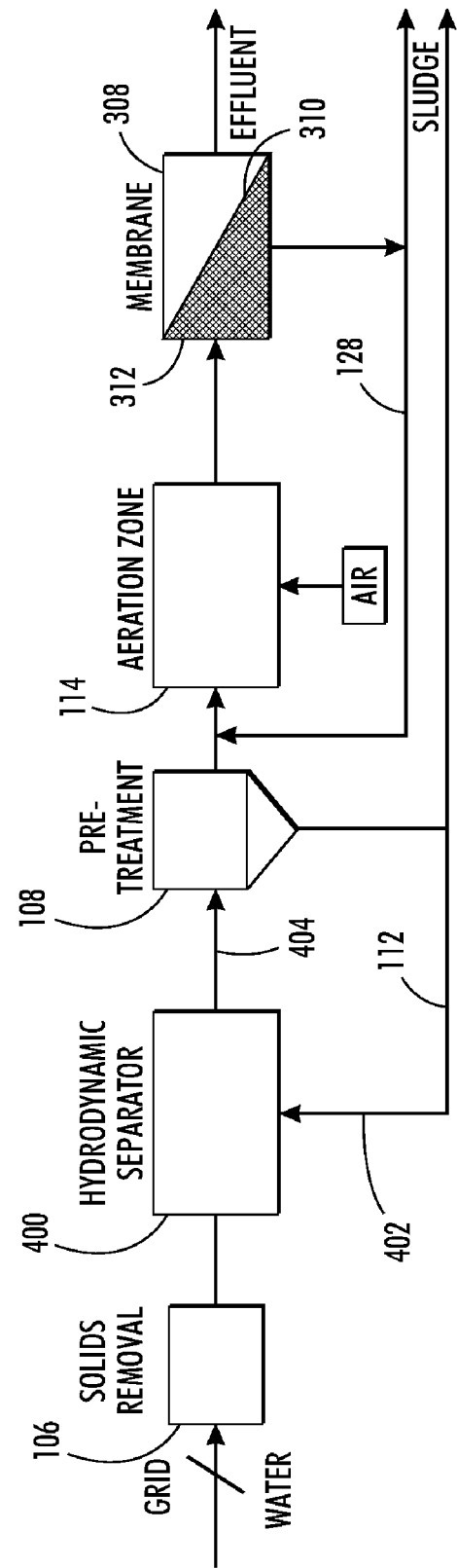
FIG. 4 illustrates another membrane bioreactor water treatment system incorporating a hydrodynamic separator.

Alternative to the system design shown in FIG. 3, in another embodiment shown in FIG. 4 hydrodynamic separator 400 is located prior to pretreatment system 108, i.e., between pretreatment system 108 and solid removal process module 106, wherein the sludge material is provided to line 112 via output line 402 and acted-upon source water is moved to pretreatment system 108, via line 404. In a further embodiment shown in FIG. 5 hydrodynamic separator 500 is located after the aeration zone 114 prior to the source water 102 being supplied to filtering module 308. Thus, in this embodiment hydrodynamic separator 500 will again remove TSS and pass the sludge component via line 502 to line 112, prior to the source water reaching filtering or membrane module 308 via line 504.

The foregoing are examples of positions where the hydrodynamic separator may be located in the MBR-lite source water processing system. It is to be appreciated that the hydrodynamic separator may also be positioned at other locations within the water treatment system. A concept common to each of the embodiments is, however, directed to removing TSS and other fouling matter prior to having an interaction with filtering module 308.

Figure 5:
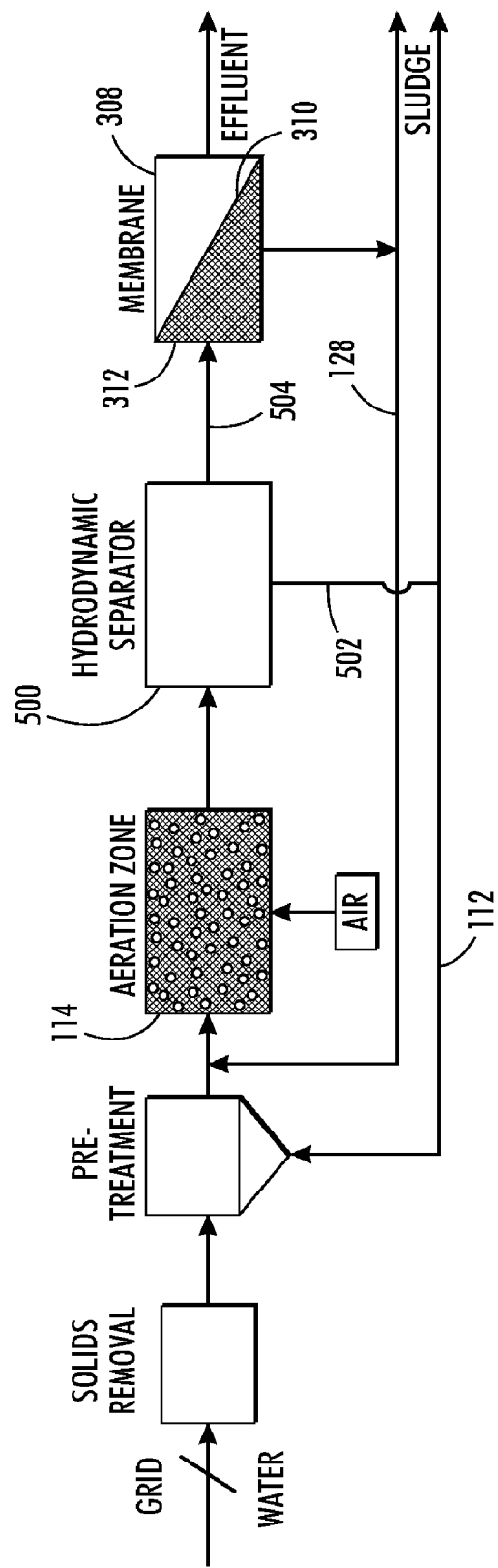
FIG. 5 illustrates another membrane bioreactor water treatment system incorporating a hydrodynamic separator.

The MBR-lite process systems of FIGS. 3-5 optionally employs prescreening to remove hair, fibers, etc., and in some embodiments use the same type of screens (down to 0.1 mm) used for pretreatment of existing MBR systems (i.e., those that use the high-cost hollow fiber membrane systems). It is noted prescreening used ahead of the aeration basin further reduces the organics and solid loads to the aeration basin and the hydrodynamic separator, improving overall performance.

Figure 6:
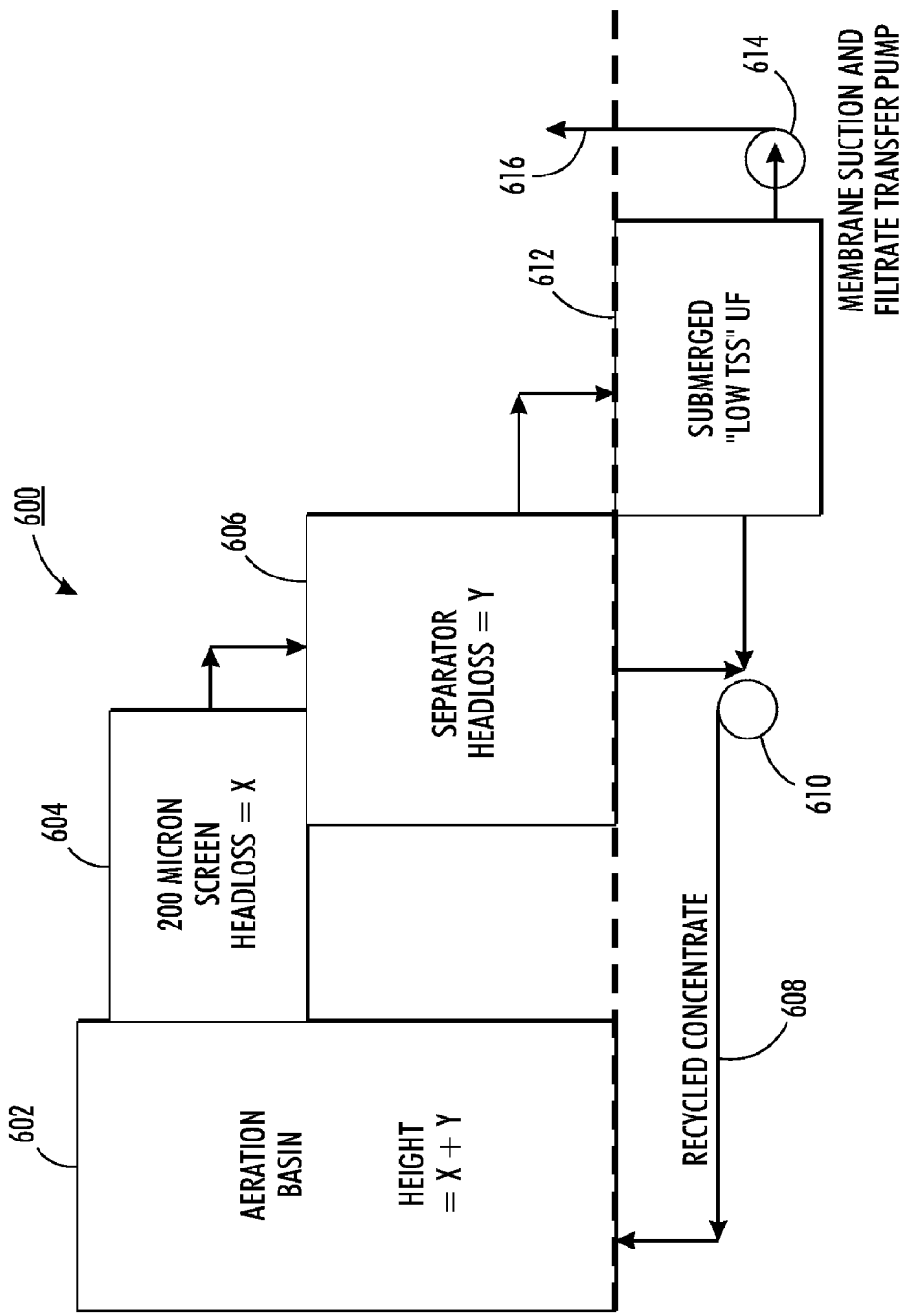
FIG. 6 illustrates an MBR-Lite configuration for a membrane bioreactor water treatment system incorporating a hydrodynamic separator, wherein the filtering membrane module is submerged.

Turning to FIG. 6, set forth is a diagram of a portion 600 of a MBR-lite source water treatment system similar to that of FIGS. 3-5, which addresses energy requirements of such systems. In particular this figure focuses on head-losses occurring in the systems. Head-loss has to do with the total amount of energy in the water. The amount of head is expressed in length and defines how high the water can rise. A common equation that is used with head is Bernoulli's equation. Head loss, more particularly, is a measure of the reduction in the total head (sum of elevation head, velocity head and pressure head) of the fluid as it moves through a fluid system. Head loss is unavoidable in real fluids. It is present because of: the friction between the fluid and the walls of the pipe; the friction between adjacent fluid particles as they move relative to one another; and the turbulence caused whenever the flow is redirected or affected in any way by such components as piping entrances and exits, pumps, valves, flow reducers and fittings. The head loss for fluid flow is directly proportional to the length of pipe, the square of the fluid velocity, and a term accounting for fluid friction called the friction factor. The head loss is inversely proportional to the diameter of the pipe.

$$\text{Head Loss} = f \frac{Lv^2}{D}$$

One known manner of calculating head loss is by use of the Hazen-William Equation. Another formula is Manning's formula which is common for gravity driven flows in open channels. In this equation, the friction factor f is determined by the relative roughness of the pipe and the Reynolds number, which is $R=(DV/nu)$, where D is the diameter of the pipe and nu is the kinematic viscosity and V is the velocity of the fluid. It is known that if there is too much head-loss then water will not flow, in such situations pumps are then needed to produce water flow.

System portion 600 of FIG. 6, starts at the aeration zone 602 (such as aeration zone 114) is noted to have a height defined as X+Y. The water from the basin is passed through a micro-screen 604 (not shown in FIGS. 3-5, but understood to be included in alternative implementations). Passing the source water through micro-screen 604 results in a source water head-loss equal to a height X. The source water from micro-screen 604 is then provided to hydrodynamic separator 606 (such as hydrodynamic separator 308), having a height Y. Passing through hydrodynamic separator 606 therefore results in a source water head-loss equal to height Y. The filtered output (e.g., TSS or sludge) from the hydrodynamic separator 606 is passed back to aeration zone 602 as a recycled concentrate via line 608, with the assistance (in some embodiments) of pump 610. The source water from which the TSS has been removed is then provided to submerged filter module 612 (such as MBR type membranes 310). The filtered source water is then passed to transfer pump 614 and output via line 616. FIG. 6 is intended to show an understanding that there will be certain headloss/energy loss occurring through the screen 604 and hydrodynamic separator 606. In particular, the energy from the height of the aeration basin being X+Y, there is a headloss equal to X in the screen 604, and a headloss equal to Y in the hydrodynamic separator 606. Therefore there is a need for the described pumps.

By review of existing systems by the inventors it is understood by the inventors that approximately 40% of the energy used to treat municipal wastewater with MBR based systems is required to prevent solids from plugging the MBR membranes. The hydrodynamic separator described herein substantially eliminates this energy requirement. However, as shown in FIG. 6, the present embodiments of MBR-lite do require energy (e.g., use of pumps) to address head-loss due to the use of the hydrodynamic separator. Nevertheless, as shown in the chart below, dependent upon the height of the aeration basin 602, net energy savings would exist by implementation of MBR-lite as compared to the operational energy requirements of existing MBR systems. Thus, for example, for an aeration basin 20 feet in height (i.e., X+Y=20 ft.), the overall operational energy requirements for an MBR-lite system which implements membranes having filtering capabilities of less than 100 mg/l TSS, compared to existing MBR systems which include membranes for filtering of up to 12,000 mg/l TSS, is believed to be approximately 28%-32% less. Since at 20 ft. the savings versus MBR is between about 70%-83% and the percent of the overall system energy is 40%, so about 70%-83% of 40% is between about 28%-32%.

| X + Y | kwh/m3* | % Savings vs MBR** |
|---|---|---|
| 10 ft | 0.015 | 79%-92% |
| 20 ft | 0.030 | 70%-83% |
| 30 ft | 0.045 | 62%-75% |

*Pump energy (kwh/m3) = 0.00146 × head-loss and assumes 60% pump efficiency and 95% motor efficiency.
**MBR energy assumed to be 0.18 kwh/m3, for aeration requirements of MBR alternatives as reported in Black and Veatch, "Cost Effective & Energy Efficient MBR Systems" by C. L. Wallis-Lage, S. D. Levesque, which reported a range of 0.18 to 0.73 kwh/m3.

Figure 7:
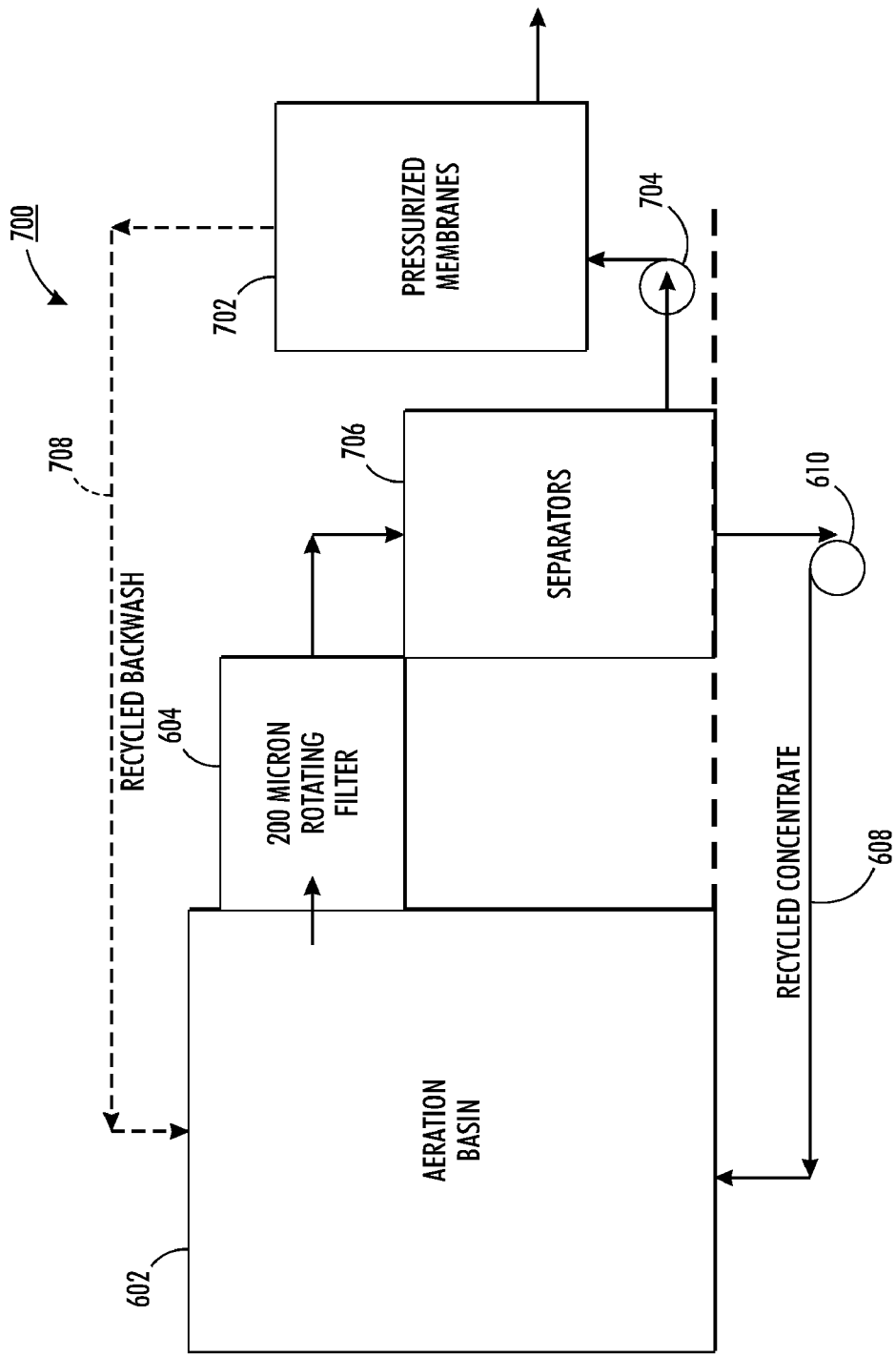
FIG. 7 depicts a further illustration of an MBR-Lite configuration for a membrane bioreactor water treatment system incorporating a hydrodynamic separator, wherein the filtering membranes are pressurized.

Turning to FIG. 7, illustrated is another diagram of a portion 700 of a MBR-lite source water treatment system similar to those of FIGS. 3-5. This system portion is substantially similar to that of FIG. 6, except instead of the submerged UF of FIG. 6, pressurized membranes 702 are used. In this design, as the membranes 702 are not submerged, a pump 704 is located to take the output from the hydrodynamic separator 706 (606 of FIG. 6) and pump the output to the pressurized membranes 702. A further difference is that a portion of the source water output 708 from the pressurized membranes 702 is shown as being provided to the aeration zone as recycled backwash for cleaning purposes. Thus the foregoing illustrates the energy requirements of such a MBR-lite system.

Figure 8:
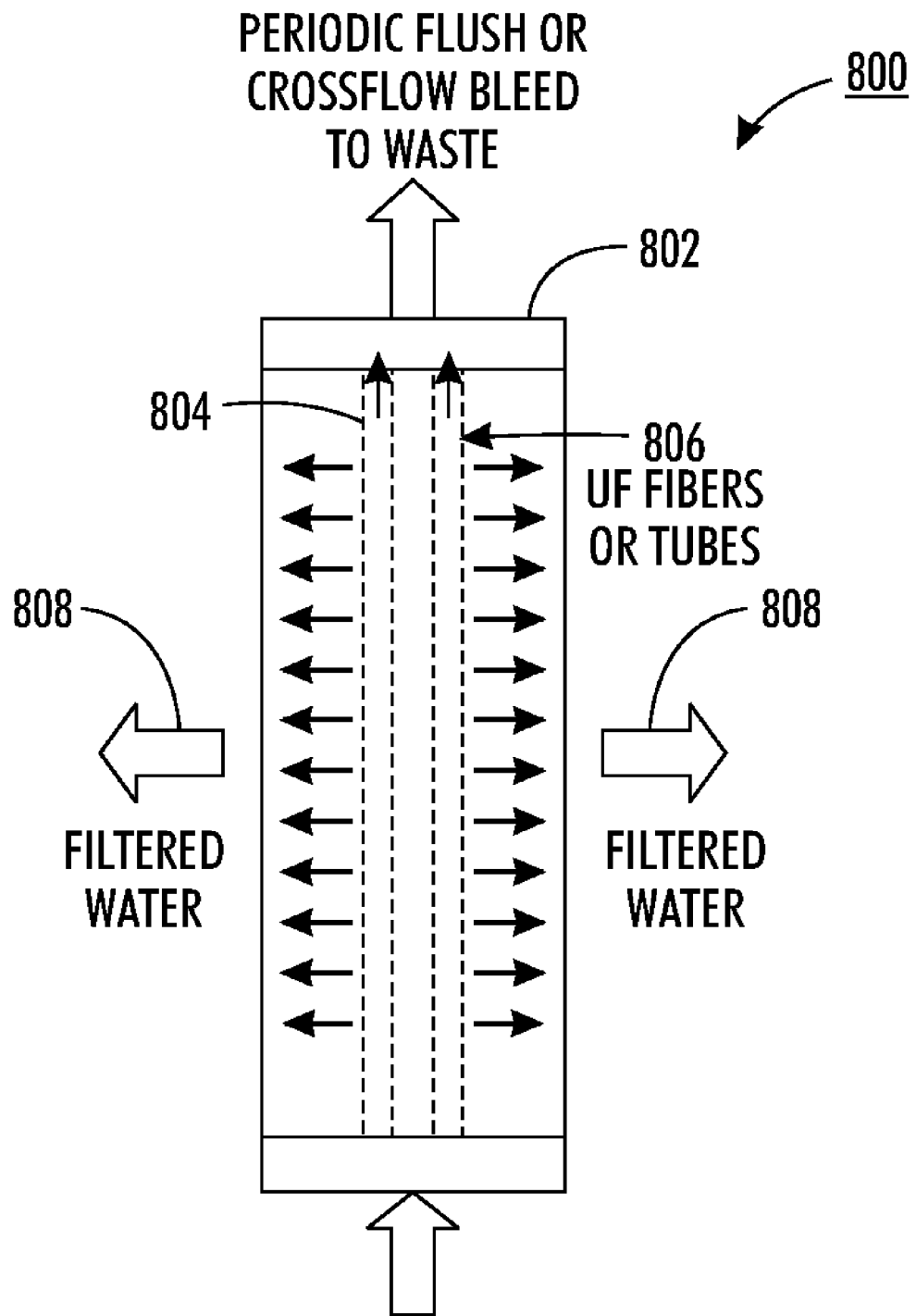
FIG. 8 depicts a more detailed view of a membrane of the membrane modules of the present application.

In FIG. 8 a more detailed example of a pressurized membrane 800 as used in FIG. 7 is shown. Source water 802 from the hydrodynamic separator is input into the pressurized membranes 804, which have UF fibers or tubes 806 running through a center portion. As the source water passes through the UF fibers or tubes 806 this filtered source water exits the membrane via the left and right sides as filtered water 808. The UF fibers or tubes 806 are periodically cleaned, by performing a flush of cross-flow bleed of the membranes, whereby the waste water is removed via output 810.

Figure 9:
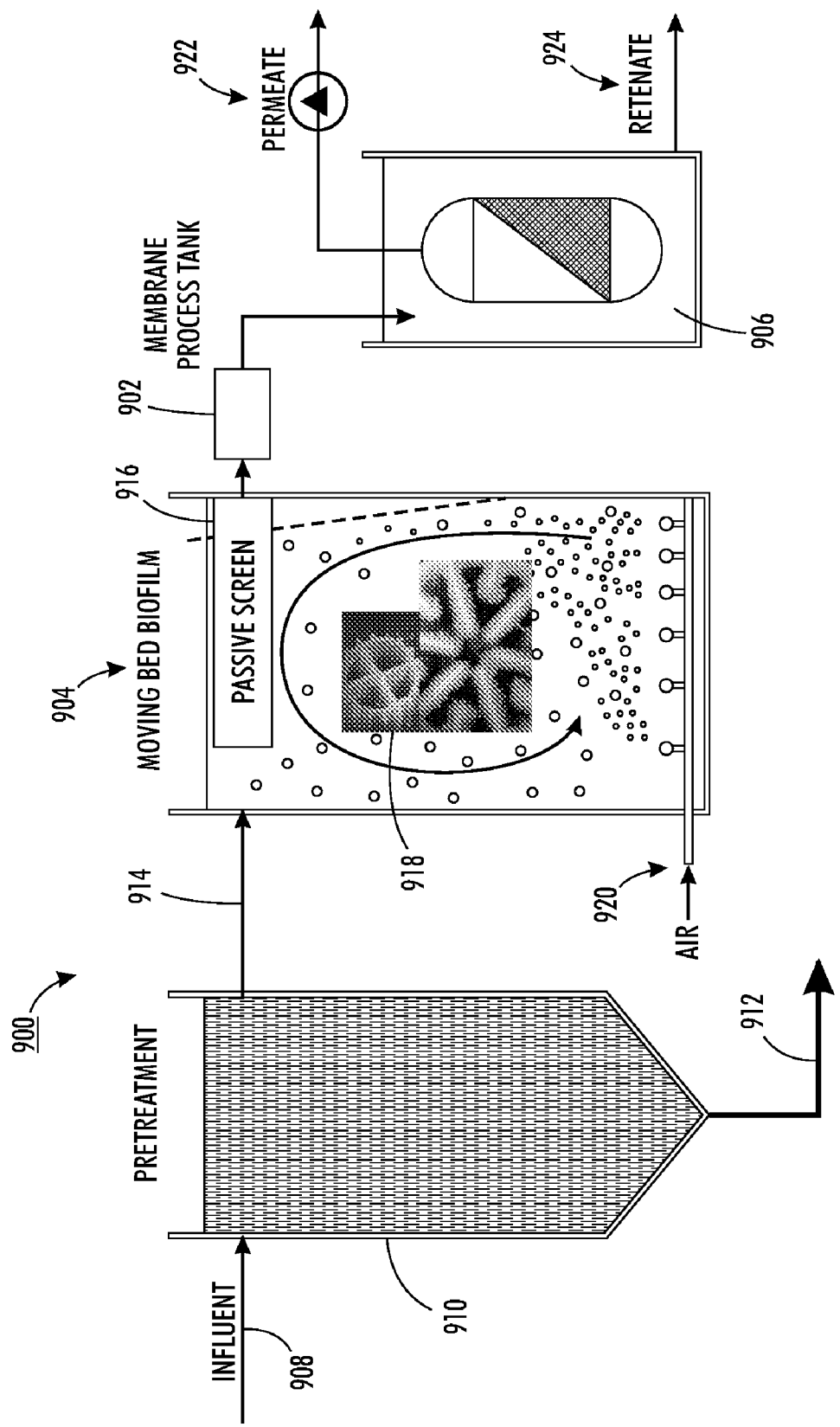
FIG. 9 depicts a moving bed bioreactor (MBBR) water treatment system integrating a hydrodynamic separator with ultra-filters.

Turning to FIG. 9 depicted is another embodiment of the present application, where a moving bed bioreactor (MBBR) water treatment system 900 incorporates hydrodynamic separator 902. Implementation of the hydrodynamic separator 902 provides higher concentration source water for the MBBR, allowing for higher efficiency. Additionally, faster dissolved Chemical Oxygen Demand (COD) removal and higher rates of methane generation may be accomplished at lower energy requirements by use of the hydrodynamic separator.

Moving bed bioreactors (MBBRs) use fixed biomass on fluidized plastic media to allow for space savings. In existing systems only 30 minutes of MBBR aeration time is required to remove soluble COD. The TSS load is, however, at the high end for conventional UF type membranes, especially if iron salts are used to remove phosphates. The hydrodynamic separator 902 inserted as shown in FIG. 9, between high rate moving bed bioreactor (MBBR) (also called a moving bed biofilm membrane reactor—MBB-M-R) 904 and the UF type membranes 906 mitigate this issue. More particularly, in FIG. 9, MBBR source water processing system 900 provides the integration of hydrodynamic separator 902 and UF membrane 906 with high rate moving bed bioreactor (MBBR) 904, which results in significant energy, space and cost advantages. In the system, source water 908 is provided to a pretreatment system 910, such as known in the art. This pretreatment system performs initial separation operations (such as separation by use of gravity) and a certain amount of separated sludge water is removed via line 912 while source water 908 to be further acted upon is passed via line 914 to the MBBR 904. A passive screen 916 is provided to maintain the individual elements of fluidized plastic media having fixed biomass 918 within the body of the reactor. Aeration is supplied via air input line 920. As previously mentioned the acted upon source water 908 is then provided to hydrodynamic separator module 902 for TSS removal. Thus, the TSS is removed prior to the water being processed by the membranes 906. Then water to be maintained is output via line 922, and wastewater is moved via line 924.

Thus, in this embodiment, adding the hydrodynamic separator within the MBBR water treatment system reduces the TSS load to the membranes resulting in improved filtering performance, which in turn reduces potential fouling, cleaning frequency (e.g., backwash frequency for membrane filters, cleaning chemical costs), and membrane replacement frequency. It is to be understood, that while the hydrodynamic separator is in this embodiment positioned between the MBBR module 904 and the membranes 906, the hydrodynamic separator 902 can be located in other locations within the system such as between the pretreatment system 910 and the MBBR module 904, among others.

Figure 10:
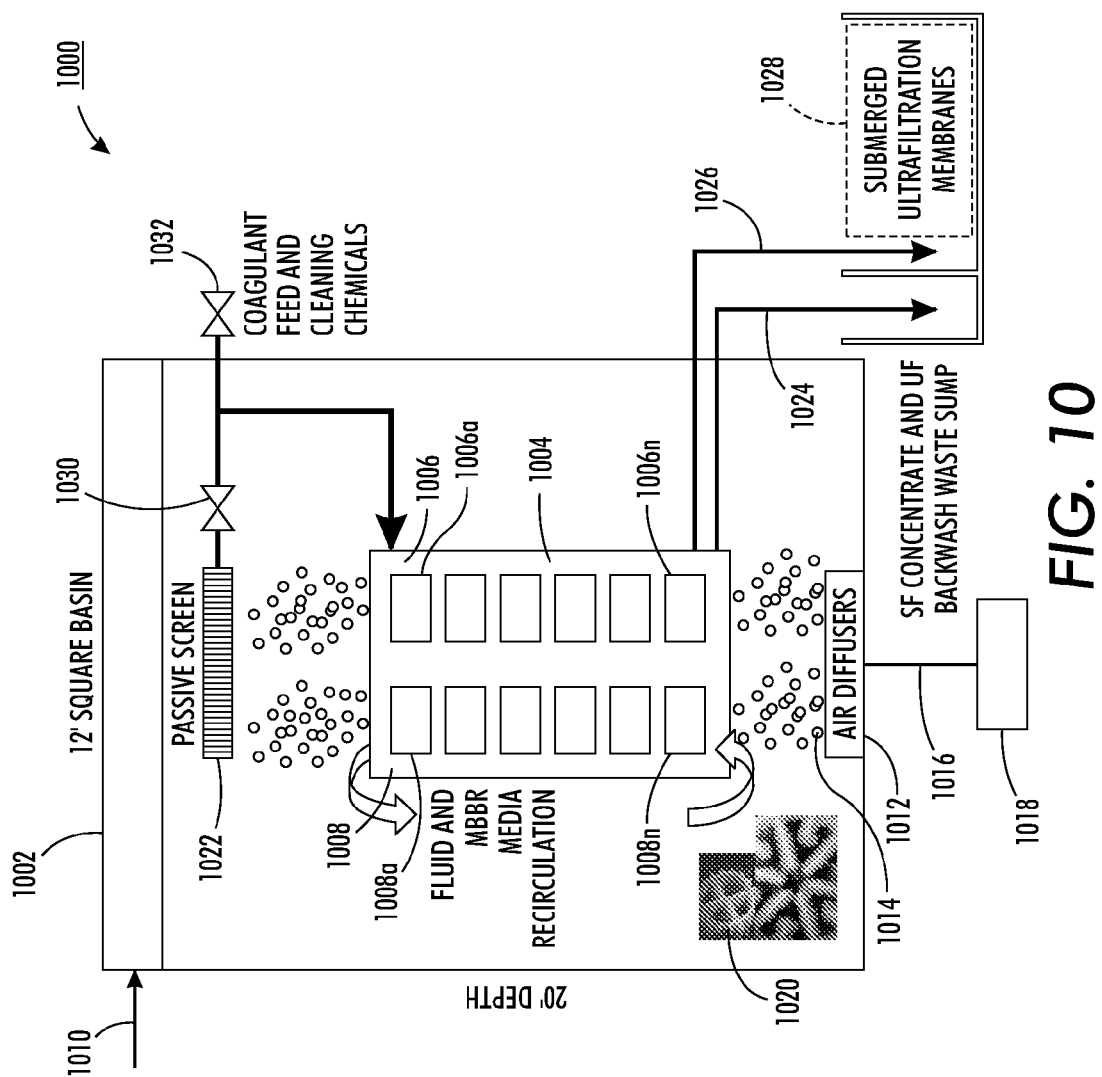
FIG. 10 illustrates a portion of a moving bed bioreactor water treatment system, wherein a hydrodynamic separator is incorporated into the MBBR aeration basin, zone or bath.

FIG. 10, depicts a portion 1000 of another MBBR water treatment system. In particular, FIG. 10 focuses on the MBBR module 1002. This embodiment incorporates hydrodynamic separator 1004 submerged into the MBBR module 1002. As shown, the hydrodynamic separator 604 is in the form of two separate towers 1006 and 1008, where each tower in turn is made up of individual hydrodynamic separator devices 1006a-1006n and 1008a-1008n. Source water 1010 is input into the MBBR module 1002. Air diffusers 1012 receive air 1014 from air input line 1016 which is supplied by air generator 1018, similar to that as shown in FIG. 9. Also similar to FIG. 9, the system includes the fluidized plastic media having fixed biomass (media) 1020, which are maintained within the reactor 1002 by passive screen 1022. The hydrodynamic separator towers 1006 and 1008 also act as draft tubes for aeration and media recirculation, by allowing movement of the air from diffusers to be circulated in the MBBR module. The air is also used to keep the media retention passive screens 1022 from being blocked with the media. In this embodiment, the source water from the hydrodynamic separator 1004 is output via line 1018 and the water containing removed particulates (TSS) is output via line 1024. Thereafter, the separated water is moved via line 1026 to membrane module 1028 for further processing, such as by a submerged or pressurized ultra-filtration membrane system as shown in previous figures. Valves 1030 and 1032 permit for the addition of coagulant feed when further floc development is desired and also for the provision of cleaning chemicals when the system is being cleaned. In the embodiment of FIG. 10, the MBBR module 1002 a 12 ft. square basin on its top, with a 20 ft. depth.

Figure 11:
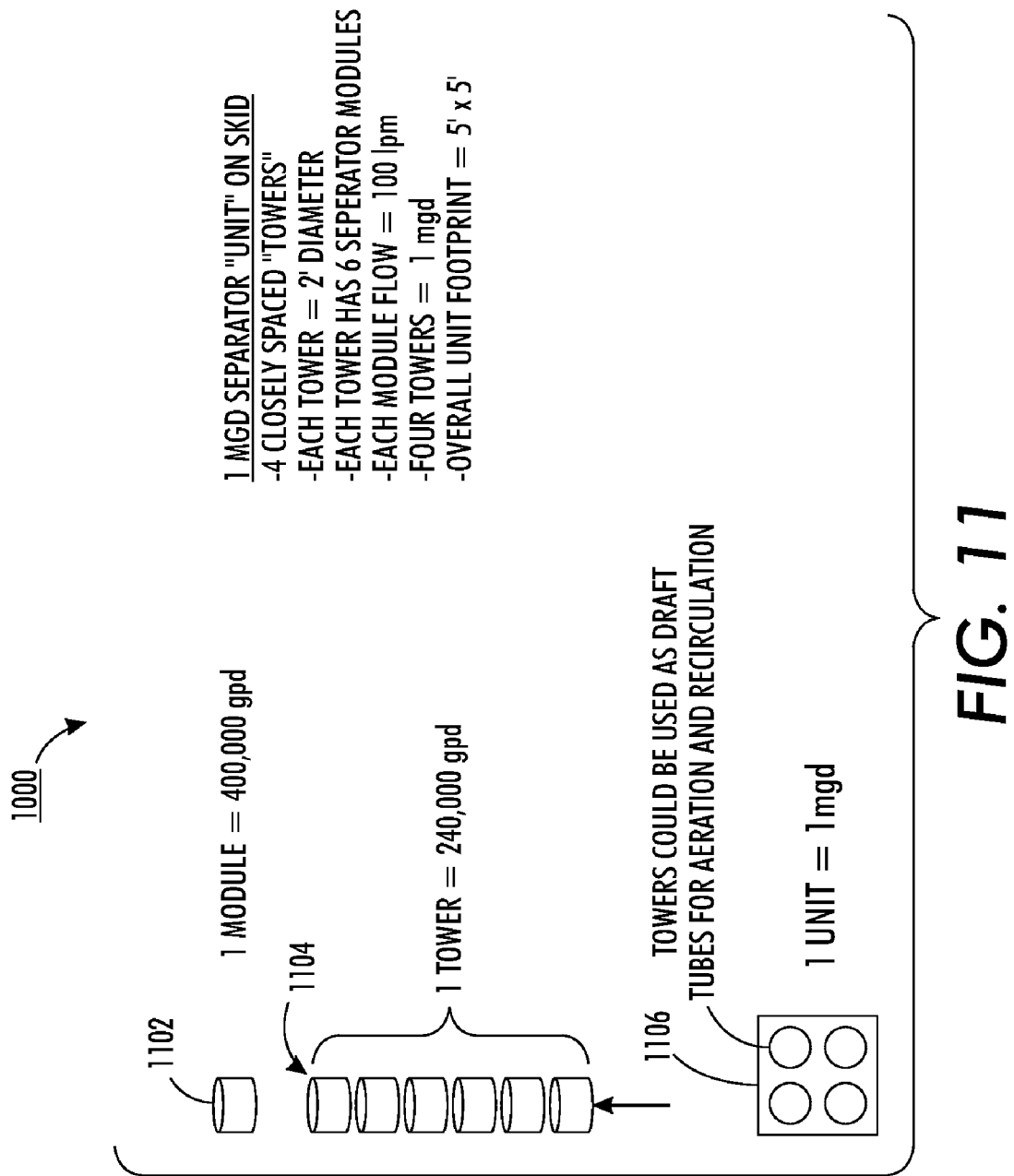
FIG. 11 shows construction of a hydrodynamic separator unit designed for MBR-lite.

Turning to FIG. 11, additional illustrations of a single hydrodynamic separator device 1102, a hydrodynamic separator tower arrangement 1104, and a hydrodynamic separator unit 1106 are shown. The hydrodynamic separator tower 1104 is comprised of multiple single separator devices 1102 having capabilities of, for example, separating 40,000 gallons per day. A tower of six separators would therefore be able to filtrate or separate 240,000 gallons per day. Then four individual towers, when combined as a unit is able to separate 1 million gallons per day. In such a unit each tower might have a 2 ft. diameter, and each tower may have 6 separate devices. Each device flow equals 100 liters per minute, such that, again, the unit (formed of four towers) has the capability of acting on 1 million gallons of water per day. The overall unit 1106 footprint could be as small as 5 ft. by 5 ft., for example, at its base.

Figure 12:
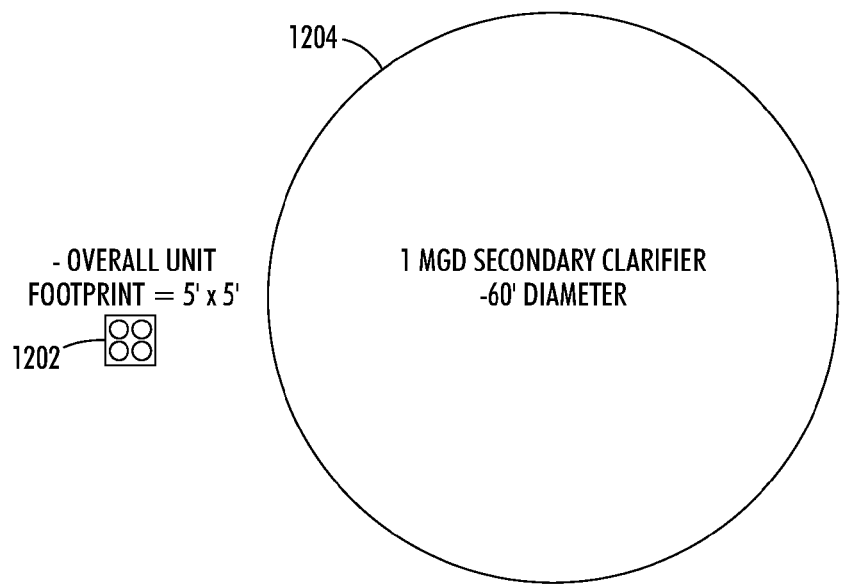
FIG. 12 provides a comparative analysis of the size between a conventional secondary clarifier plus ultra-filters, and a hydrodynamic separator plus ultra-filters used in water processing systems.

FIG. 12 shows that use of the hydrodynamic separator units of the present description allows for the formation of a water processing system having a smaller footprint than is possible using existing system components such as conventional secondary clarifiers. This difference in size is shown more particularly in FIG. 12 where the footprint for a 1-million-gallon-a-day hydrodynamic separator unit 1202 using the present embodiments may, as mentioned above, have an overall unit footprint of 5 ft×5 ft, whereas a 1-million-gallon-a-day secondary clarifier 1204 would have a diameter of approximately 60 ft, thus, allowing the present system to operate in much smaller areas.

With continuing attention to the hydrodynamic separators, these components may come in a variety of formats and designs as described, for example in various ones of the previously hereby incorporated by reference documents. Therefore as examples of such configurations but not being limited thereto, it is noted FIGS. 13-17 depict some of such noted variations.

Figure 13:
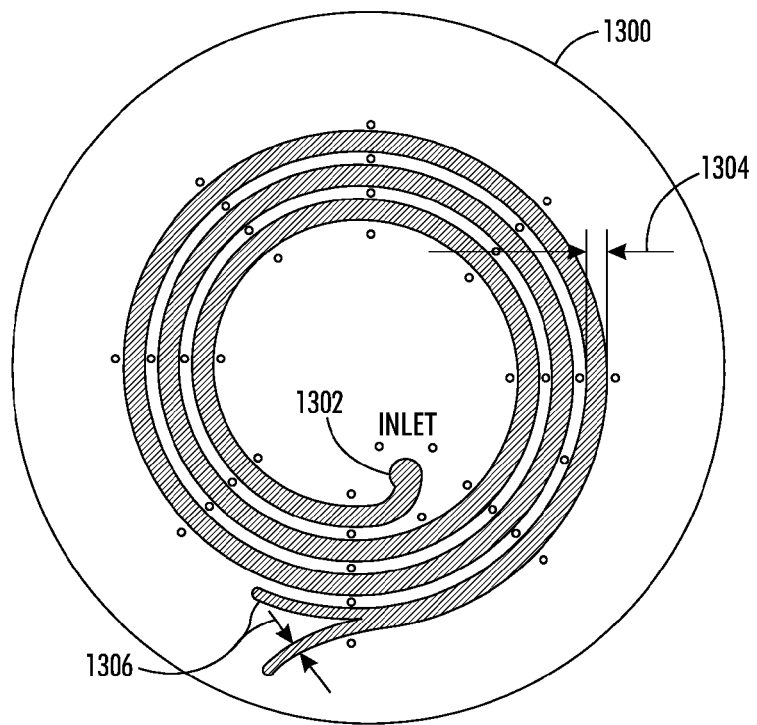
FIG. 13 illustrates one embodiment of a single hydrodynamic separator which may be used in the concepts of the present application.

With reference now to FIG. 13, a single planar spiral separation device 1300 is illustrated. The device 1300 has an inlet 1302, at least one curved or spiral portion 1304 and outlets 1306. This planar multi-turn spiral channel device 1300, in one form, may be cut from plastic. The type of plastic may vary as a function of the specific application and the environment in which it is implemented. In one variation of the device 1300, the center region of the device 1300 near the inlet 1302 may be removed to allow access for an inlet coupler to be described hereafter. The spirals portion 1304 of the device may take a variety of forms. For example, the spiral portion 1304 may be converging or diverging. As a further example, the outlet 1306 and inlet 1302 locations may be interchanged to suit the application, e.g. for increasing or decreasing centrifugal forces. A centrifugal force generates a flow field in the fluid, e.g., water, that will sweep suspended particles to one side of the channel, including neutrally buoyant particles (e.g., particles having substantially the same density as water, or the fluid in which the particles reside). Separation efficiency depends on many parameters, including, for example, geometry of the channel and flow velocity. Forces on the particles include centrifugal forces and pressure driven forces, among others.

It should be appreciated that the fundamental operation of individual curved or spiral hydrodynamic separation devices to separate particles in fluid, such as device 1300 or other devices contemplated herein, is described in detail in selected portions of the above referenced patent applications (which are incorporated herein by reference). Therefore, such operation will not be described herein except to the extent that such description will enhance the description of the presently described embodiments.

Figure 14:
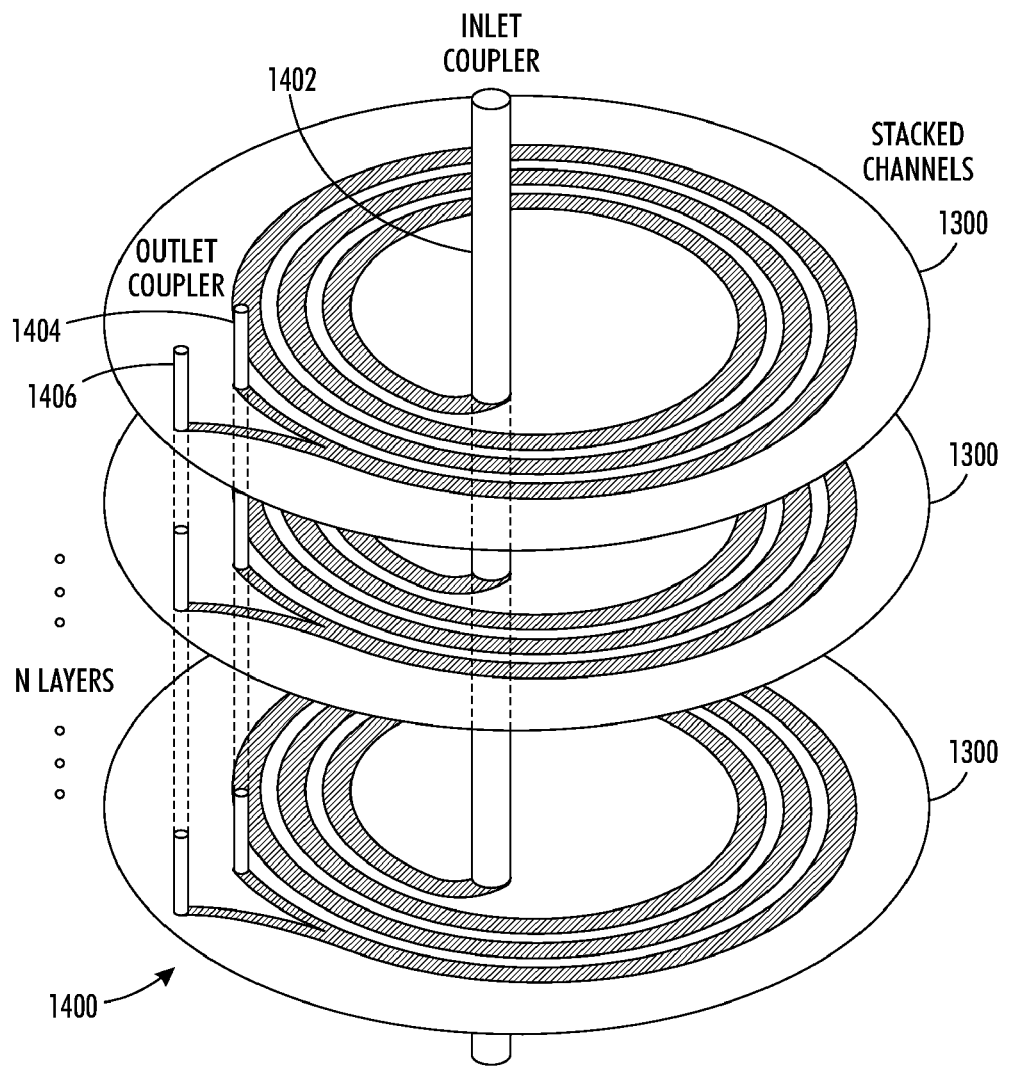
FIG. 14 depicts a tower of hydrodynamic separators such as shown in FIG. 13.

With reference to FIG. 14, a system 1400 is representatively shown and comprises a plurality of devices 1300 (shown in FIG. 13) stacked in a parallel manner to allow for N-layers of parallel processing of fluid. Also representatively shown in FIG. 14 is an inlet coupler 1402—which allows for input fluid to be provided to each device 1300 within the entire stack from a common supply source. The inlet coupler 1402 may take a variety of forms; however, in one example, the inlet coupler 1402 is cylindrical and has perforations formed therein. The perforations correspond to inlets of the devices 1300 stacked in the system 1400. Outlet couplers of a similar configuration may also be implemented. Two outlet couplers 1404 and 1406 are representatively shown here, although the number of outlet couplers could vary based on the number of outlet paths or channels for each stacked device. The inlet coupler may be joined only with the top channel through an external Al plate, for example. Fluidic connection to all layers may be achieved by punching through all the top layers except for the bottom. At least two fluidic outlets, or outlet couplers such as those shown at 1404 and 1406, may be connected in the same manner on the top plate. All inlet and outlets connections may also be implemented on the bottom plate.

Figure 15:
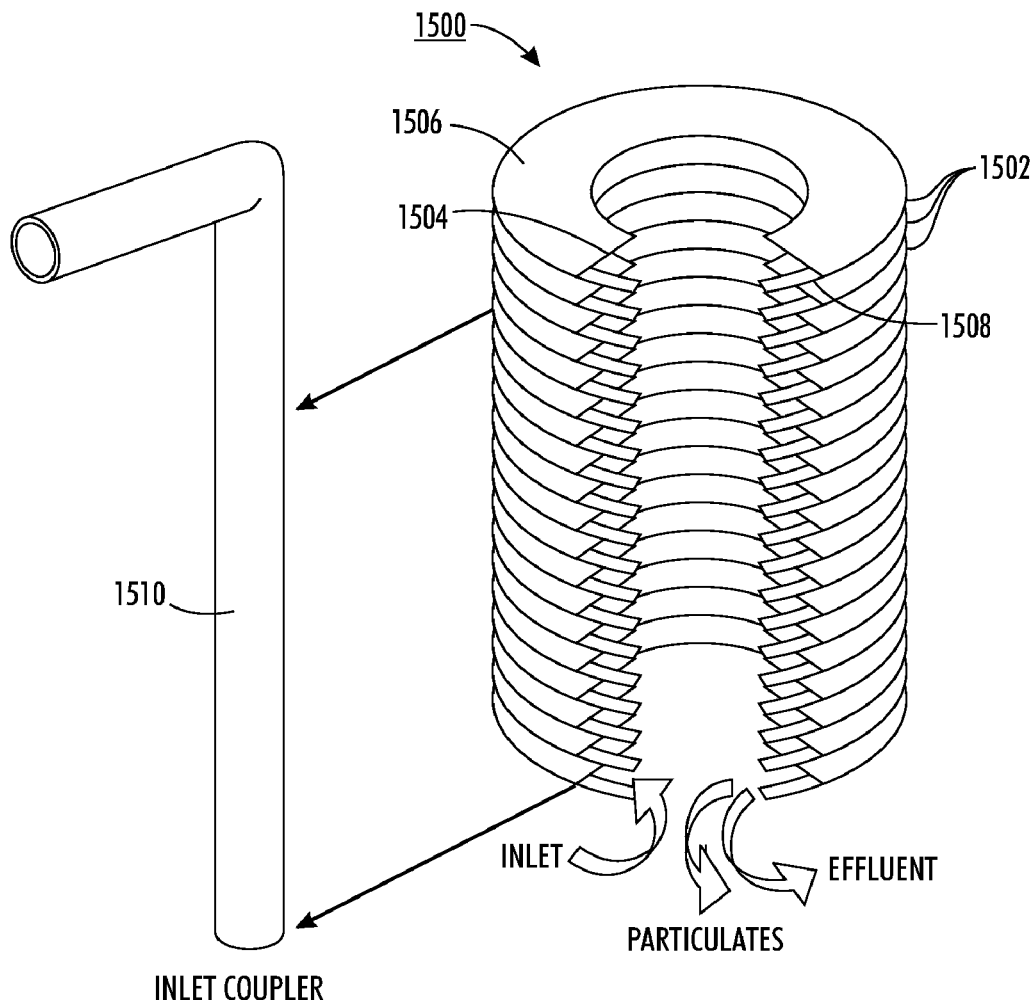
FIG. 15 depicts a tower of hydrodynamic separators which may be used in connection with the concepts of the present application.

With reference to FIG. 15, a system 1500 comprises multiple planar curved arc segments 1502 (e.g. fractional arc segments) that are vertically stacked as parallel channels to increase throughput. These planar curved arc segments do not complete a loop for any one segment 1502, although the characteristics and functions of a spiral device will nonetheless apply to these segments 1502 in this case. The arc segments or curved portions 1502 comprise an inlet 1504, curved or arc section 1506 and an outlet 1508. Also shown in FIG. 15 is an inlet coupler 1510 that, again, allows for an inlet of fluid from a common source to all of the separate arc segments shown. It should be appreciated that the inlet coupler may take a variety of forms. In one form, the inlet coupler is a cylinder and has perforations or a continuous slot corresponding to the inlet of each layer. Like the system 1400 of FIG. 14, the system 1500 provides for increased throughput for fluid particle separation. At least one outlet coupler (not shown) may also be implemented. The outlet coupler(s) could resemble the inlet coupler of FIG. 14, for example.

Figure 16:
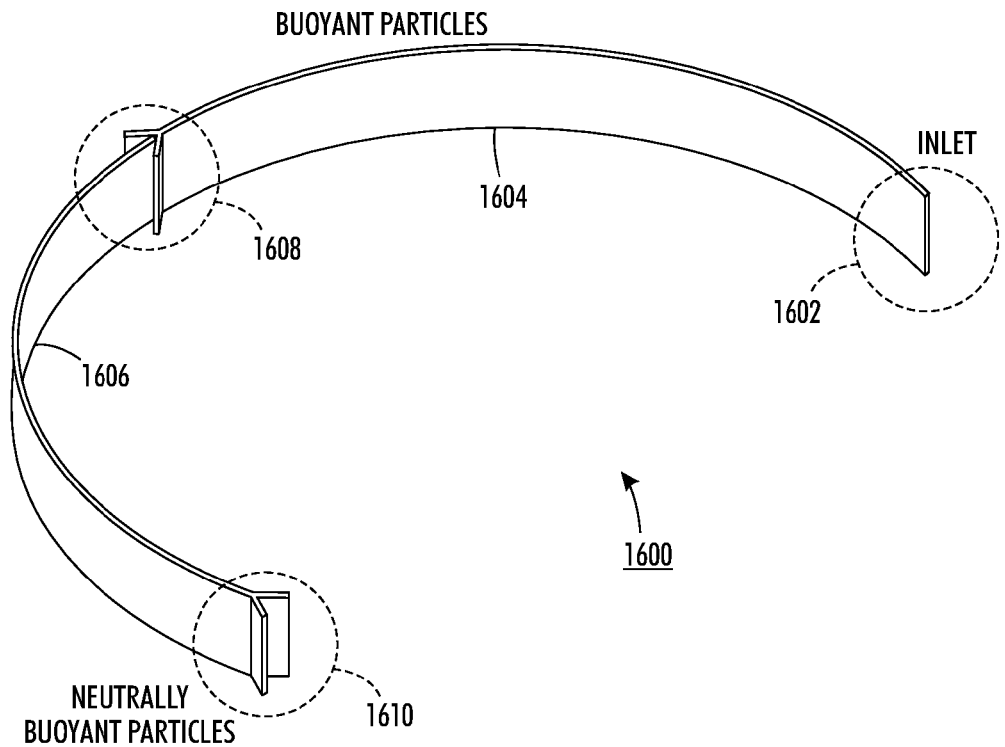
FIG. 16 depicts an alternative embodiment of a hydrodynamic separator tower which may be used in the present application.

With reference to FIG. 16, another planar curved structure 1600 comprising stacked channels (not shown individually) is shown. The curved structure 1600 has an inlet 1602 (which may include an inlet coupler), curved portions 1604 and 1606, and at least one outlet 1608 or 1610. As shown, there is an outlet 1608 for selected particles such as particles of a particular size or density (e.g. buoyant particles). The outlet 1608 is positioned midway around the curve between the curved portion 1604 and curved portion 1606. A second outlet 1610 for selected particles of a second size or density (e.g. neutrally buoyant particles) is positioned at an end of the curve opposite the inlet 1602. In general, these outlets 1608 and 1610 can be used to remove particles of varying sizes or densities from the fluid flow. As above, at least one outlet coupler may also be utilized.

Figure 17:
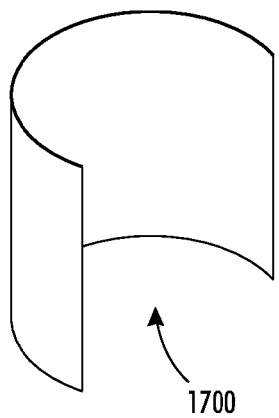
FIG. 17 depicts a further embodiment of a hydrodynamic tower that may be used within the concepts of the present application.

With reference to FIG. 17, a system 1700 is shown. The system 1700 comprises a plurality of devices 1600, as shown in FIG. 16, that are stacked in a configuration to allow for increased throughput by way of parallel processing. It should be appreciated that the system 1700 may also comprise a single device of increased width. Of course, as above, an inlet coupler and/or at least one outlet coupler may be implemented in the system.

The described separators can remove >90% of total suspended solids (TSS) continuously and without a filtration barrier. The described hydrodynamic separators also allow variable flow splitting of effluent/waste streams to cater to design needs—50:50 is a good operational spec but such separators can be configured to vary up to a 90:10 split between cleaned water which is the portion of the source water from which sufficient TSS has been removed so that it may be used for its final intended purpose or is in a state that further processing may be undertaken so it becomes appropriate for an end purpose and water that is defined as waste water that is either disposed of or resent through the system for further separation.

The described systems have low energy requirements, small footprints, and are low cost, simple, robust low-maintenance operation and construction that allow for substitution of expensive MBR membranes with less expensive ones.

It has also been shown that the hydrodynamic separator can be incorporated with a moving-bed bioreactor (MBBR). This design provides more concentrated feed water allowing for higher efficiency—faster dissolved COD removal, and higher rates of methane gas generation. Removal of TSS by the hydrodynamic separator in turn lowers stress on the membranes, which reduces fouling potential, cleaning frequency (e.g., backwash frequency for membrane filters, cleaning chemical costs) and membrane replacement frequency for MBR membranes. The present systems also increase average energy efficiency of MBR system by reducing slope of flux decline curve from TSS foul. As well as reducing waste sludge volume, treatment costs, and offsite disposal costs.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A membrane based bio-reactor water treatment system comprising:
    a water in-take for receiving source water into the system;
    a solids removal module configured to receive the source water from the water in-take;
    a pretreatment module configured to receive the source water from the solids removal module;
    an aeration zone configured to receive the source water from the pretreatment module;
    a membrane module configured to receive the source water from the aeration zone; and
    a hydrodynamic separator configured within the system to receive the source water prior to the source water being received by the membrane module, the hydrodynamic separator configured to remove total suspended solids (TSS) from the source water prior to the source water being received by the membrane module.

2. The system according to claim 1 wherein the hydrodynamic separator is positioned between the pretreatment module and the aeration zone.

3. The system according to claim 1 wherein the hydrodynamic separator is positioned between the solids removal module and the pretreatment module.

4. The system according to claim 1 wherein the hydrodynamic separator is positioned between the aeration zone and the membrane zone.

5. The system according to claim 1 wherein the membrane module is configured with at least a membrane having a filtering capacity to filter water with less than 100 mg/l of total suspended solids.

6. The system according to claim 1 wherein the membrane module is configured with at least a membrane having a filtering capacity to filter water with more than 100 mg/l of total suspended solids, up to 12,000 mg/l total suspended solids.

7. The system according to claim 1 wherein the system removes >90% of total suspended solids (TSS) continuously without a filtration barrier.

8. The system according to claim 1 wherein the hydrodynamic separator provides a variable flow split between a clean water stream and a waste water stream.

9. The system according to claim 8 wherein the flow splitting ranges from a 50:50 split to a 90:10 split between cleaned water and waste water.

10. The system according to claim 1 wherein the hydrodynamic separator has a footprint of approximately 5 ft by 5 ft.

11. The system according to claim 1, wherein the membrane module is a membrane bioreactor (MBR) module, wherein energy savings to operate the MBR module of the system incorporating the hydrodynamic separator provides an energy savings of approximately 62% to 92% over the energy needed to operate the MBR module in a MBR based water treatment system without a hydrodynamic separator.

12. The system according to claim 1 wherein the slope of floc decline curve from TSS foulants is decreased compared to existing MBR based water treatment systems.

13. A moving bed bio-reactor based water treatment system comprising:
    a water in-take for receiving source water into the system;
    a solids removal module configured to receive the source water from the water in-take;
    a pretreatment module configured to receive the source water from the solids removal module;
    a moving bed bioreactor module configured to receive the source water from the aeration zone; and
    a hydrodynamic separator configured within the system to receive the source water prior to the source water being received by the moving bed bioreactor module, the hydrodynamic separator is configured to remove total suspended solids (TSS) from the source water prior to the source water being received by the moving bed bioreactor module.

14. The system according to claim 13 wherein the hydrodynamic separator is located within the moving bed bioreactor module.

15. The system according to claim 13 wherein the hydrodynamic separator is located between the pretreatment module and the moving bed bioreactor module.

16. The system according to claim 13 wherein the membrane module is configured with at least a membrane having a filtering capacity to filter water with less than 100 mg/l of total suspended solids.

17. The system according to claim 13 wherein the membrane module is configured with at least a membrane having a filtering capacity to filter water with more than 100 mg/l of total suspended solids, up to 12,000 mg/l total suspended solids.

18. The system according to claim 13 wherein the system removes >90% of total suspended solids (TSS) continuously without a filtration barrier.

19. The system according to claim 13 wherein the hydrodynamic separator provides a variable flow splitting of a clean water stream and a waste water stream.

20. The system according to claim 13 wherein energy savings to operate the MBR module of the system incorporating the hydrodynamic separator provides an energy savings of approximately 62% to 92% over the energy needed to operate the MBR module in a MBR based water treatment system without a hydrodynamic separator.

* * * * *